Aug. 21, 1956　　　H. A. SCHNEIDER　　　2,760,089

PULSE TRAIN GENERATOR CIRCUITS

Filed Sept. 10, 1953　　　3 Sheets-Sheet 1

INVENTOR
H. A. SCHNEIDER
BY James D. Falk
ATTORNEY

INVENTOR
H. A. SCHNEIDER
BY
[signature]
ATTORNEY

INVENTOR
H. A. SCHNEIDER
BY James W. Falk
ATTORNEY

United States Patent Office 2,760,089

Patented Aug. 21, 1956

2,760,089

PULSE TRAIN GENERATOR CIRCUITS

Herbert A. Schneider, Coytesville, N. J., assignor to Bell Telephone Laboratories, Incorporated, New York, N. Y., a corporation of New York Application September 10, 1953, Serial No. 379,452

18 Claims. (Cl. 307—106)

This invention relates to electrical circuits and more particularly to such circuits for generating a train of pulses in response to an initiating pulse or signal.

In computer and other electrical systems, a single pulse may serve as a signal to a circuit component so that the circuit component be enabled for any information pulses that may be transmitted to it during the next group of digit intervals or time periods when pulses might be present. One way of enabling this circuit component is to apply to it enabling pulses in coincidence with the information pulses. It is therefore often desirable to generate a train of enabling pulses in response to this signal pulse, the train comprising a pulse for each digit interval the circuit component is to be enabled. In certain circuitry the component is to be enabled for a continuous number of digit intervals whereas in other circuitry the component may be enabled for a first group of continuous pulses, disabled for one or more digits, and then enabled again for a second group of pulses.

It is a general object of this invention to provide improved circuits for the generation of continuous or discontinuous trains of pulses in response to the appearance of a single initiating pulse or signal.

More specifically objects of this invention include providing such improved circuits utilizing relatively inexpensive elements having long lives entailing minimal power requrements and capable of being mounted in very compact units.

These and other objects of this invention are attained in certain specific embodiments of this invention by connecting the inputs of delay lines to the conducting paths between a number of unidirectional current elements connected in series. Each of these delay lines is terminated substantially in an open circuit and therefore a pulse applied to the input of the delay line is reflected back by the termination, reappearing at the input delayed by twice the delay of the line and being of the same polarity as the applied pulse. The unidirectional current elements may be simple OR circuits, comprising one or more diodes, as is known in the art, or amplifier circuits which serve both to prevent the reflected pulses travelling back along the conducting path and to amplify and reshape the pulse.

To obtain a continuous train of N pulses, the number of delay lines employed will be between $N-1$ and $n$, where $n$ is defined by $N'=2^n$, N′ being the smallest number equal to or larger than N for which $n$ is an integer. The total delay of the delay lines to generate N pulses is $(N-1)/2$ digits of actual or unreflected delay. Also the delay of any one line should be equal to or less than the total delay of all the other lines plus one-half the time interval between successive pulses. An initiating pulse is applied to the series connected unidirectional current elements and to the interposed inputs of the open circuit terminated delay lines; by properly correlating the number of delay lines and the delay of each line in accordance with the principles of this invention a continuous train of pulses appears at the output of the last unidirectional current element. This last element is advantageously an amplifier circuit to provide a train of pulses of uniform shape, amplitude, and power.

In other illustrative embodiments of this invention, pulse trains having specific discontinuities may be provided either by particular choice of the delays of the various open circuit terminated delay lines connected in the circuit or by utilizing a combination of pulse train generator circuits in accordance with this invention.

In still another specific illustrative embodiment of this invention, a three pulse train may be generated by a circuit employing but a single delay line if the termination of that delay line comprises a very high impedance or resistance connected to an OR circuit. A pulse transmitted along the delay line will then both be transmitted through the high impedance and the OR circuit and also reflected by the high impedance, which approximates an open circuit termination.

In still other embodiments of this invention the delay line instead of having one input terminal connected in shunt to the conducting path and being terminated substantially in an open circuit has both input terminals connected to the conducting path so as to be connected in series therein and is terminated substantially in a short circuit.

It is a feature of this invention that a circuit for generating pulse trains in response to a single initiating pulse include delay lines connected to the conducting path to which the pulse is applied and terminated so as to cause both the pulses applied to the delay lines and reflected therefrom to appear on the conducting path as a pulse train.

It is a feature of this invention that a circuit for generating a train of pulses in response to a single initiating pulse comprise a delay line terminated substantially in an open circuit and having its input connected to a conducting path between two unidirectional current elements.

It is a further feature of this invention that a continuous train of pulses be generated by a circuit comprising a number of unidirectional current elements, such as OR and amplifier circuits, connected in series and open circuit terminated delay lines having their inputs connected to the conducting paths between such unidirectional current elements. In accordance with this feature of the invention for the generation of a continuous train of N pulses the number of delay lines is between $N-1$ and $n$, where $n$ is defined by $N'=2^n$, N′ being the smallest number equal to or larger than N for which $n$ is an integer. Further, in accordance with this feature, the total delay of the delay lines to generate N pulses is $(N-1)/2$ digits or pulse time intervals of delay and the total actual or unreflected delay of any one line is equal to or less than the total delay of all the other lines plus one-half the time interval between successive pulses.

It is a feature of certain specific illustrative embodiments of this invention that the total delay of a single line be greater than that of the other lines by an amount sufficient to introduce one or more missing pulses symmetrically located in the middle of the pulse train.

It is a feature of certain other specific illustrative embodiments of this invention that a number of pulse train generation circuits be combined in a single circuit with delay and other circuits interposed between them so that a discontinuous pulse train of any number of pulses and with any number of missing pulses may be generated.

It is a feature of still another specific illustrative embodiment of this invention that a delay line be terminated by a very high impedance connection to an OR circuit, the impedance being sufficiently high so that the termination approximates an open circuit and thereby causes a pulse transmitted along the delay line to be reflected back to the input of the delay line but at the same time allowing a portion of that pulse to be transmitted through the high impedance and the OR circuit to trigger an output amplifier or other device.

It is a feature of other specific illustrative embodiments of this invention that a delay line be connected in series in the conducting path between successive unidirectional current elements or amplifiers by having its two input terminals connected to the conducting path and that the two output terminals of the delay line be effectively short circuited.

A complete understanding of this invention and of these and other features thereof may be gained from consideration of the following detailed description and the accompanying drawing, in which.

Figure 6:
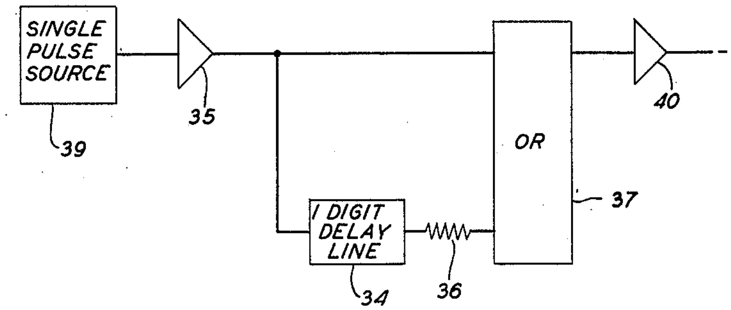

Fig. 6 is a circuit representation, in block diagram form, of another illustrative embodiment of this invention wherein a three pulse train is generated by a circuit employing a single delay line in response to a single initiating pulse; and Fig. 7 is a circuit representation, in block diagram form, of another specific illustrative embodiment of this invention wherein pulse train generation is attained by employing delay lines effectively terminated in a short circuit.

Figure 1:
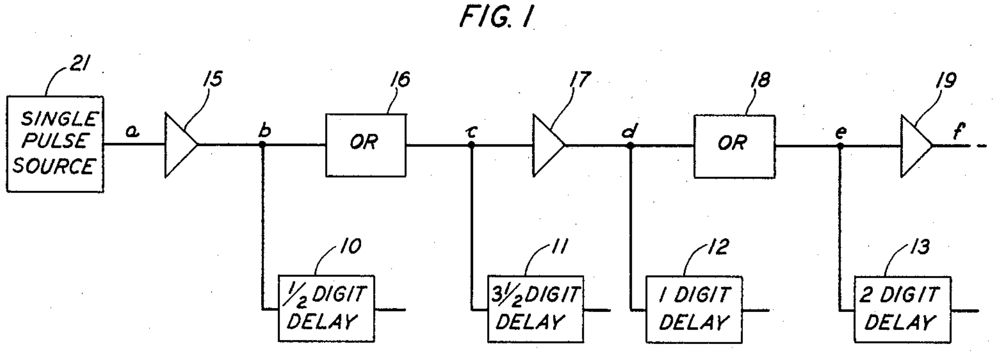
Fig. 1 is a circuit representation, in block diagram form, of one specific illustrative embodiment of this invention wherein a continuous fifteen pulse train is generated in response to a single initiating pulse.

Turning now to the drawing, the specific illustrative embodiment depicted in Fig. 1 comprises a fifteen pulse train generator circuit having four delay lines 10, 11, 12 and 13, each terminated substantially in an open circuit. The inputs of these lines are connected to the conducting paths between five unidirectional current elements 15, 16, 17, 18 and 19 connected in series and advantageously comprising either amplifier or OR circuits; in the specific embodiment depicted elements 15 through 19 are alternately an amplifier and an OR circuit. A single initiating pulse is applied to this circuit from a single pulse source 21, which actually may be the components and control circuits of the electrical system of which this circuit is a part and which supplies the initiating pulse when a pulse train of this length is required. Amplifier 15 may be incorporated into the prior circuitry designated by source 21 or may be distinct therefrom, as depicted.

In the specific embodiment depicted, delay line 10 has a physical delay equal to one-half the time interval between the start of successive pulses in the train to be generated; this time interval is generally referred to as one digit time or just one digit and therefore the physical delay of line 10 is one-half digt. It is important to refer to this as the physical or actual delay since pulses after traveling down the delay line are reflected back, by the substantially open circuited termination, and reappear at the input of the delay line one digit later. Thus due to the reflection the reflected pulses are delayed twice the physical delay of the line. Delay lines 11, 12 and 13 have, respectively, three and one-half, one and two digits of physical delay in this specific illustrative embodiment.

Figure 2:
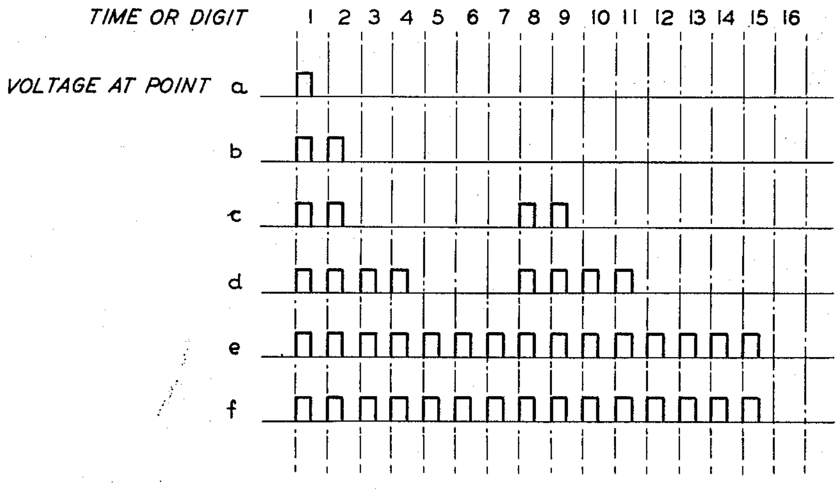
Fig. 2 is a time voltage chart for voltages at various points in the circuit of Fig. 1, assuming negligible attenuation in the delay lines.
Figure 2:
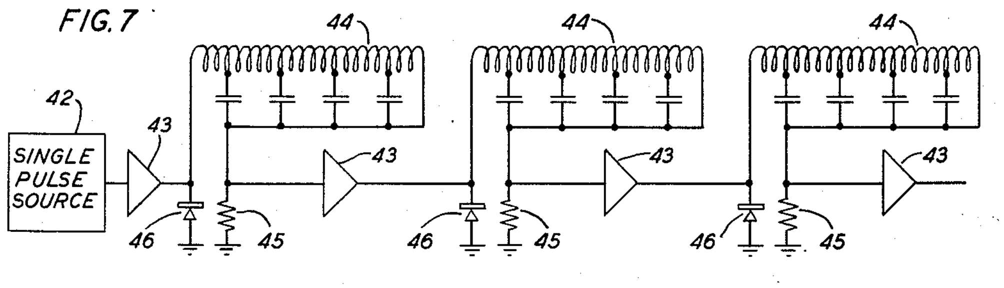

In Fig. 1 the input point is designated *a*, the output point *f*, and the connections of the inputs of the delay lines to the paths between the unidirectional elements are designated *b*, *c*, *d*, and *e*, respectively. Turning now to Fig. 2 there is shown the voltages or pulses at each of these points during operation of the circuit. As can be seen the initial pulse appears substantially simultaneously at all points during the first time interval or digit. One digit later this pulse, reflected back from delay line 10, appears at points *b*, *c*, *d*, *e* and output *f*. At the start of the third digit the first or initial pulse is reflected back from delay line 12 to point *d* and thus appears at points *d*, *e* and output *f*. In this manner at the start of each digit of time interval a pulse is reflected back from one of the delay lines and appears at the output *f* so the output at *f* is a continuous train of fifteen pulses.

While four specific delay lines 10, 11, 12 and 13 have been depicted in the embodiment of Fig. 1, other combinations of open circuit terminated delay lines may be employed in accordance with the general principles of my invention. If we consider the general case in which it is desired to generate a continuous train of N pulses in response to the single pulse from the pulse source 21, then $(N-1)/2$ digits of actual delay must be provided. The maximum number of open circuit terminated delay lines that can be utilized to realize this is $(N-1)$, in which case each delay line would have merely a half digit of actual delay. While circuits comprising this maximum number of delay lines may be utilized in accordance with this invention to provide pulse train generation, it is of course understood that it is more economical to consider the minimum number of distinct delay lines that is required. This minimum is determined by $n$ in the expression $N'=2^n$, where N' is the smallest number equal to or larger than N for which $n$ is an integer. Thus for fifteen pulses in the pulse train, $N=15$, the maximum number of delay lines is fourteen and the minimum number four as $N'=16=2^4$.

If more than the minimum number of delay lines are employed, there is an overlapping of pulses. In the specific embodiment set forth above and illustrated in Figs. 1 and 2, the output at *f* in each digit or time interval is due to but a single pulse reflected from one of the delay lines, except for the initial pulse and the pulse at digit 8 which is reflected both from delay lines 11 and 13. If N is not a power of 2 at least one overlapping pulse is essential but by utilizing $n$ delay lines the number of overlapping pulses will be a minimum. However, if N is a power of 2 and the minimum number of delay lines are utilized no overlapping of output pulses occurs.

The required amount of actual delay, which as noted above is $(N-1)/2$ digits for a pulse train of N pulses, can be divided among the open circuit terminated delay lines in various ways depending on the number of delay lines employed. In order to provide a continuous train of pulses, i. e., a train in which a pulse appears in each digit time for the duration of the train, the actual delay of any one line should be equal to or less than the total delay of all other delay lines in the circuit plus one-half digit. If the delay of any one line is more than one-half the time interval between successive pulses greater than the total delay of all other lines no pulses will appear at the output during one or more digit intervals. If it is desired to generate discontinuous pulse trains, this fact may be utilized if the discontinuity desired is symmetrical. This can be exemplified very simply. In Fig. 1 the largest delay line, line 11, has three and a half digits of actual delay, which is just equal to the total delay of the other delay lines 10, 12 and 13. If instead delay line 11 had four and a half digits of delay the output would be a seventeen-digit pulse train with a discontinuity or a missing pulse at digit 9. Delay lines 10, 12 and 13 would generate an eight-digit train and this may be considered as being applied to the input of the four and half digit delay line. However, as the first reflected pulse will not appear back at the input until after nine digits, no pulse will appear in the ninth digit interval.

In the above discussion no importance has been placed on the order in which the delay lines are connected into the circuit. In analyzing a pulse train generating circuit in accordance with this invention it is easiest to consider that the delay lines are connected in the circuit in ascending order of length of delay, but this is not essential and they may in fact be positioned in any order. Thus in the embodiment of Fig. 1 delay line 11, having the longest delay, is positioned between the two delay lines having the shortest periods of delay. I have found that it is desirable to attempt to equalize the amount of delay between amplifier circuits so as to be able to avoid using all amplifier circuits for the unidirectional circuit elements 15 through 19. In this way the total attenuation of a pulse between amplifications is limited to less than the maximum gain of the amplifier circuits, and the less expensive and simpler OR circuits may be utilized for some of the unidirectional current elements.

Figure 3:
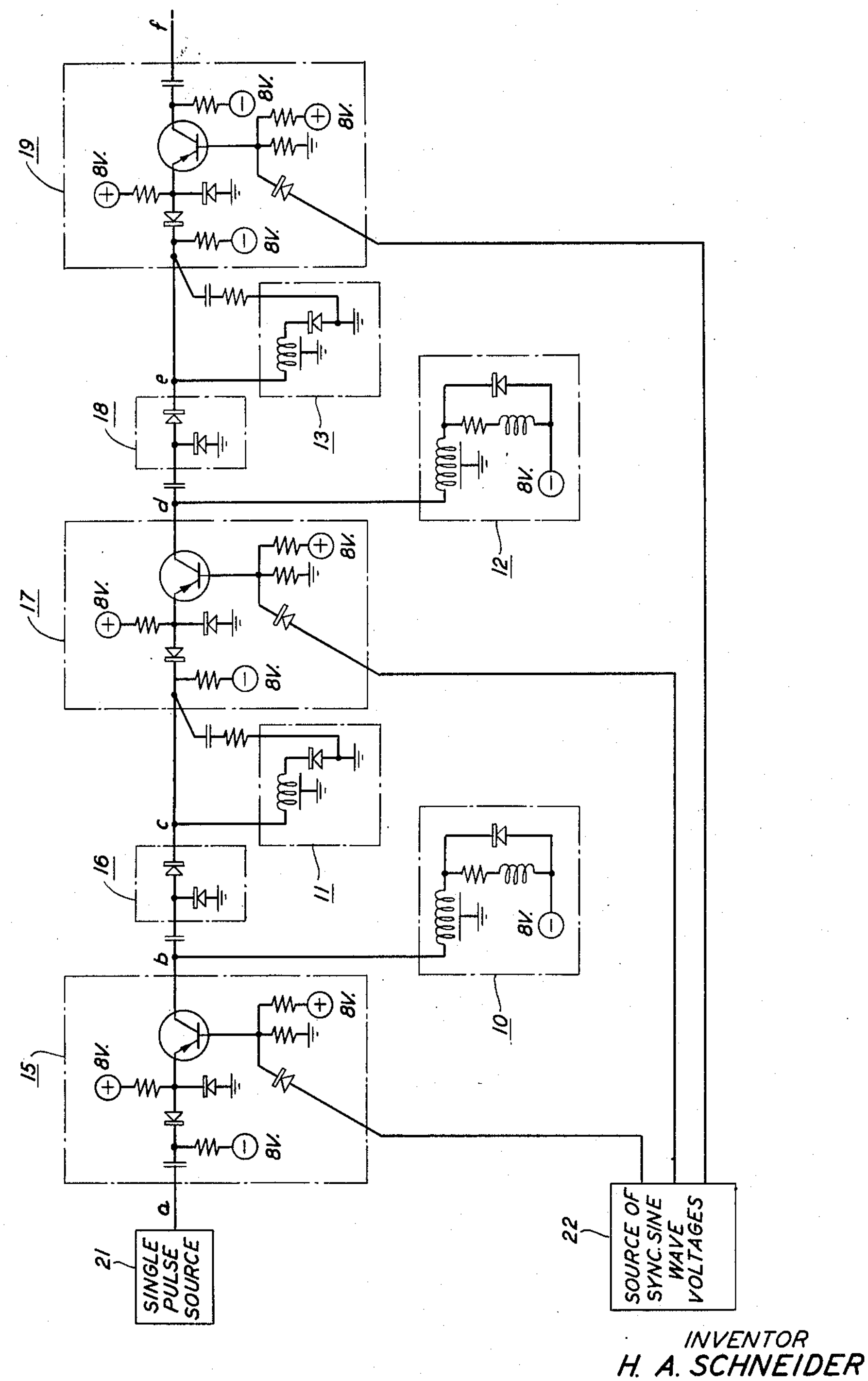
Fig. 3 is an illustrative circuit schematic for embodiment of Fig. 1.

Turning now to Fig. 3 there is depicted a circuit schematic for the illustrative embodiment of Fig. 1. Each of the amplifiers 15, 17 and 19 may advantageously comprise a transistor amplifier circuit of the type set forth in Patent 2,670,445, issued February 23, 1954, to J. H. Felker, each amplifier being triggered by a synchronous or clock signal from a source 21 of synchronous sine wave voltages. When triggered the transistor provides a low impedance path for the transmission, and amplification, of pulses in the forward direction; when not triggered the transistor prevents backward transmission of the reflected pulses. In one illustrative embodiment each of the amplifier circuits has an inherent one-quarter digit delay so that the clock signals from source 21 were applied to amplifier 17 one-quarter digit after they were applied to transistor amplifier 15 and to amplifier 19 one-quarter digit after that.

Each of the OR circuits 16 and 18 comprises a pair of diode elements, such as varistors, to enable passage therethrough of only positive pulses in the forward direction. Each of the delay lines 10 through 13 may comprise inductive members and capacitances, as is known in the art. One particular type of delay line that may be employed comprises coils wound on an insulating rod with button condensers connected between a turn of each coil and ground; such a delay line is shown at page 214 of the book "Components Handbook," J. F. Blackburn, Ed. (M. I. T. Radiation Laboratory Series, vol. 17, 1949).

Figure 4:
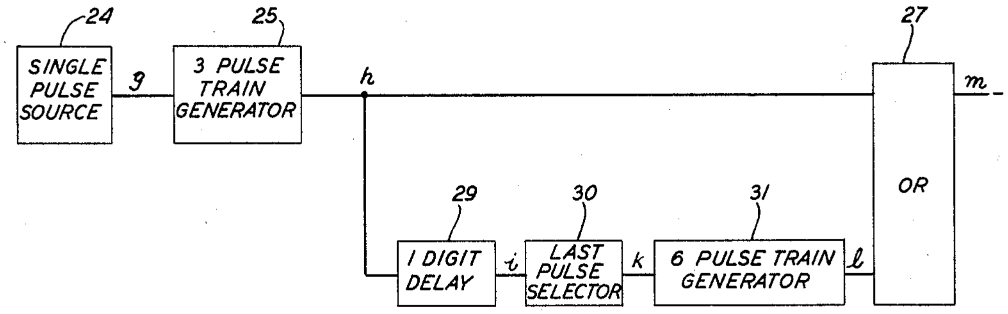
Fig. 4 is a circuit representation, in block diagram form, of another specific illustrative embodiment of the invention wherein a ten-digit pulse train is generated in response to a single initiating pulse, the train being discontinuous in that no pulse is present in the fourth digit.
Figure 5:
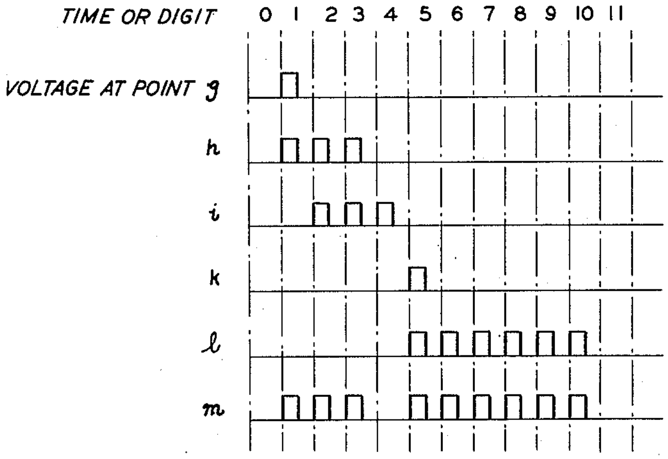
Fig. 5 is a time-voltage chart for voltages at various points in the circuit of Fig. 4, assuming negligible attenuation in the delay lines.

Turning now to Figs. 4 and 5 there is depicted another specific illustrative embodiment of this invention wherein a discontinuous train of pulses is to be generated in response to a single pulse and specifically a ten-digit pulse train in which no pulse is present in the fourth digit interval. An initiating pulse is applied from a single pulse source 24 to a three-pulse train generator circuit 25 of the type of Fig. 1; the output of the pulse train generator circuit 25 is therefore three pulses appearing in the digit intervals 1, 2 and 3, as seen in Fig. 5 as the voltage appearing at point *h* in Fig. 4. These pulses are applied to an OR circuit 27 and appear as the first three pulses of the output at point *m*. They are also applied through a delay line 29, which introduces a one-digit delay, to a last pulse selector circuit 30. This circuit, which may be of the type described in my application Serial No. 379,451, filed September 10, 1953, passes only the last pulse of the train and delays it one digit. Therefore a single pulse appears at point *k* delayed by two digit intervals from the last pulse from the pulse train generator circuit 25. This single pulse serves as the initiating pulse for a six pulse train generator circuit 31 the output of which is also applied to the OR circuit 27. The output of the OR circuit is therefore a discontinuous train of pulses comprising first three pulses in successive digit intervals, a missing pulse, and then six pulses in successive digit intervals.

The arrangement of Fig. 4 indicates one specific manner in which a discontinuous train of pulses of any number of pulses and breaks or discontinuities in the pulse train may be attained. The positioning of the missing pulse or discontinuity may be readily determined to be in any digit or digits in the pulse train. Another specific illustrative embodiment of this invention for the generation of a train of three pulses, such as may be employed in the embodiment of Fig. 4, is depicted in Fig. 6 and utilizes the fact that pulse reflection is attainable even though the termination of the delay line is not a perfect open circuit. In this embodiment a one-digit delay line has its input connected to an amplifier 35 and its output through an impedance 36 to an OR circuit 37, the impedance 36 being high relative to the characteristic impedance of the delay line. The initiating pulse from the single pulse source 39 is amplified and shaped by the amplifier 35 and applied directly to the OR circuit 37. It is also applied to the one-digit delay line 34 and through the impedance or resistance 36 to the OR circuit 37. Because of the high impedance only a portion of the pulse power is transmitted through it directly to the OR circuit while the remainder is reflected back to the input of the delay line and this reflected pulse applied to the OR circuit 37.

In this manner three successive pulses are transmitted through the OR circuit 37 to an output amplifier 40. While the pulses will be of different amplitudes and the second and third pulses will be considerably weaker, due to the high resistance 36, they will each be sufficiently large to trigger the output amplifier and thus a reshaped and standard amplitude pulse train will appear at the output of the amplifier 40.

In the above discussion embodiments of this invention have been described in which pulse train generation has been attained by connecting a delay line substantially terminated in an open circuit in shunt onto the conducting path between successive amplifier circuits, the one input terminal of the delay line being connected to the conducting path and the other input terminal being grounded. Thus in the embodiment depicted schematically in Fig. 3 the one input terminal connected to the series coils or inductance elements of the delay line is connected to the conducting path while the other input terminal connected to the condensers or capacitive elements, and depicted merely as a plate capacitively coupled to the coils, is grounded. In accordance with another aspect of this invention however pulse train generation may be attained by utilizing delay lines if these conditions are transposed. Turning now to Fig. 7 there is depicted another specific illustrative embodiment of this invention in which pulse train generation is attained by utilizing delay lines terminated substantially in a short circuit but connected in series in the conducting path.

In Fig. 7 a single pulse source 42 applied an initiating pulse to the series combination of amplifier circuits 43 and delay lines 44. As can be seen in the drawing the two input terminals of each delay line are connected to the conducting path and the two output terminals are effectively short circuited. When a pulse from an amplifier 43 is applied to the conducting path between amplifiers it sees the series combination of the characteristic impedance of the delay line and a resistance 45. Therefore, a positive voltage will appear across the resistance 45, the value of the voltage depending on the relative values of the resistance and the characteristic impedance but the voltage being sufficient to trigger the next amplifier circuit. When the pulse is reflected by the delay line, it is inverted, as a short circuit terminated delay line reflects a pulse of reverse polarity. In the prior embodiments it has been assumed that the driving amplifier circuits were current sources having a relatively high impedance when not fired. Amplifier circuits 43 however should have a relatively low impedance for the reflected pulse and can more properly be considered voltage sources. This may be attained either by choice of amplifier or by employing a diode 46 connected between the output of the amplifier 43 and ground and poled so as to present a low impedance to ground for negative pulses. Thus when the reflected pulse appears at the input terminals of the delay line 44 as a voltage the negative side of this voltage will be effectively grounded so that the full positive voltage is developed across the resistor 45. This voltage should be of an amplitude comparable to that across the resistor 45 due to the intial pulse and will thus also trigger the next amplifier 43.

In this manner both the applied and the reflected pulses are transmitted through the next amplifier 43 to enable generation of the pulse train. Each of the limitations applicable to the prior embodiments, as to the maximum and minimum number of delay lines and the maximum delay of each line in order to attain generation of continuous pulse trains, as well as the employment of delay lines for the generation of discontinuous pulse trains apply equally to the embodiment depicted in Fig. 7.

It is to be understood that the above-described arrangements are illustrative of the application of the principles of the invention. Numerous other arrangements may be devised by those skilled in the art without departing from the spirit and scope of the invention.

What is claimed is:

1. A pulse train generator circuit comprising a pair of unidirectional current elements connected in series in a conducting path, means for applying an initiating pulse to the first of said elements in said path, and a delay line having its input connected to said path between said pair of elements and being terminated substantially in an open circuit.

2. A pulse train generator circuit comprising a plurality of unidirectional circuit elements connected in series in a conducting path, means for applying an initiating pulse to the first of said elements in said path, and individual delay lines having their inputs connected to said path between each pair of elements, each of said delay lines being terminated substantially in an open circuit.

3. A circuit for generating a plurality of pulses in response to a single initiating pulse comprising output means, unidirectional current means, a conducting path connecting said output means and said unidirectional current means, a delay line having its input connected to said path and being terminated substantially in an open circuit, and means for applying an initiating pulse to said unidirectional current means.

4. A circuit for generating a continuous train of N pulses comprising a plurality of unidirectional current means connected in series in a single conducting path, at least certain of said means comprising amplifiers, means for applying a single initiating pulse to the first of said elements in said path, and a delay line connected to said path between each pair of said elements, each of said delay lines being terminated substantially in an open circuit and the total delay of said lines being $(N-1)/2$ digit intervals between successive pulses in the train.

5. A circuit in accordance with claim 4 wherein the number of delay lines is equal to or less than N-1 and equal to or greater than $n$ where $n$ is defined by $N'=2^n$, N' being the smallest number equal to or larger than N for which $n$ is an integer, and the delay of any one line being equal to or less than the total delay of all other lines plus one-half the digit interval between successive pulses in the train.

6. A circuit in accordance with claim 5 wherein said unidirectional current means comprise alternately amplifier and diode circuits and said delay lines are arranged so that the total delay between amplifiers is balanced between said delay line lines.

7. A circuit for generating a train of pulses comprising a conducting path, means for applying an initiating pulse to said path, a plurality of delay lines having their inputs connected to said path and being terminated substantially in open circuits, and means for preventing pulses reflected from said delay lines traveling along said path towards said means for applying said initiating pulse.

8. A circuit in accordance with claim 7 for generating a continuous train of pulses wherein the delay of any one line is equal to or less than the total delay of all the other lines of the circuit plus one-half the time interval between successive pulses in the train.

9. A circuit for generating a discontinuous train of pulses comprising first pulse train generating means including a plurality of delay lines terminated substantially in open circuit, means for applying an initiating pulse to said first pulse train generating means, an OR circuit connected to the output of said first pulse train generating means, means for selecting the last pulse of a train of pulses, a delay line connected between the output of said first pulse train generating means and said selecting means, the delay of said delay line being determined by the extent of the discontinuity in the train of pulses being generated, and second pulse train generating means including a plurality of delay lines terminated substantially in an open circuit, said second pulse train generating means being initiated by the pulse from said selecting means and being connected to said OR circuit.

10. A circuit for generating a train of pulses in response to a single pulse comprising an OR circuit, a conducting path connected to said OR circuit, a delay line having its input connected to said path, a high impedance connected between the output of said delay line and said OR circuit, said impedance being sufficiently high to terminate said delay line substantially in an open circuit while yet allowing passage of current therethrough to said OR circuit, and means applying an initiating pulse to said conducting path.

11. A circuit for generating a train of pulses in accordance with claim 10 wherein the delay of said line is equal to the digit interval between successive pulses in the train of pulses, the applied pulse appearing at the output of the OR circuit in the first digit interval, the delay pulse through said impedance appearing at the output of the OR circuit in the second digit interval, and a delayed pulse reflected from said delay line appearing at the output of the OR circuit in the third digit interval, said circuit further comprising an output amplifier connected to the output of said OR circuit and each of said pulses appearing at said output being sufficiently large to trigger said output amplifier.

12. A circuit for generating a plurality of pulses in response to a single initiating pulse comprising output means, a plurality of unidirectional current means, a conducting path connecting said output means and said unidirectional current means in series, means for applying an initiating pulse to the first of said unidirectional current means, and means connected to the conducting path between each of said unidirectional current elements and the last of said unidirectional current elements and said output means for reflecting back to said conducting path the pulses applied thereto, each of said means comprising a delay line connected to said conducting path and terminated so as to reflect back to said conducting path each pulse applied thereto.

13. A circuit for generating a continuous train of N pulses in accordance with claim 12 wherein the total delay of said lines is $(N-1)/2$ digit intervals between successive pulses in the train.

14. A circuit for generating a continuous train of N pulses in accordance with claim 13 wherein the number of delay lines is equal to or less than N—1 and equal to or greater than $n$ where $n$ is defined by $N'=2^n$, N' being the smallest number equal to or larger than N for which $n$ is an integer, and the delay of any one line is equal to or less than the total delay of all the other lines plus one-half the digit interval between successuve pulses in the train.

15. A circuit in accordance with claim 12 wherein said delay lines are connected in series in said paths, the input terminals of said delay lines being connected to said paths and the output terminals of said delay lines being short circuited.

16. A circuit in accordance with claim 14 wherein said delay lines are connected in series in said paths, the input terminals of said delay lines being connected to said paths and the output terminals of said delay lines being short circuited.

17. A circuit for generating a plurality of pulses in response to a single initiating pulse comprising a pair of unidirectional current elements connected in series in a conducting path, means for applying an initiating pulse to the first of said elements in said path, and a delay line connected in series in said path, said delay line having both input terminals connected to said path and the output terminals of said delay line being effectively short circuited.

18. A circuit for generating a train of pulses comprising a conducting path, means for applying an initiating pulse to said path, a plurality of delay lines connected in series in said path, the input terminals of said delay lines being connected to said path and the output terminals of said delay lines being effectively short circuited, and means for preventing pulses reflected from said delay lines traveling along said path towards said means for applying said initiating pulse, said means presenting a low impedance path to ground to said reflected pulse.

References Cited in the file of this patent

UNITED STATES PATENTS 2,652,501 Wilson ---------------- Sept. 15, 1953